(12) United States Patent
Schreck

(10) Patent No.: US 12,456,512 B2
(45) Date of Patent: Oct. 28, 2025

(54) SYSTEMS, APPARATUSES, AND METHODS OF USING LOCAL INPUT/OUTPUT (LIO) LINES FOR PRECHARGING AND EQUALIZING DIGIT LINES OF SENSE AMPLIFIERS

(71) Applicant: MICRON TECHNOLOGY, INC., Boise, ID (US)

(72) Inventor: John Schreck, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 96 days.

(21) Appl. No.: 17/649,173

(22) Filed: Jan. 27, 2022

(65) Prior Publication Data

US 2023/0238051 A1     Jul. 27, 2023

(51) Int. Cl.
*G11C 11/4091*   (2006.01)
*G11C 5/06*      (2006.01)
*G11C 11/4074*   (2006.01)
*G11C 11/4093*   (2006.01)

(52) U.S. Cl.
CPC ............ *G11C 11/4091* (2013.01); *G11C 5/06* (2013.01); *G11C 11/4074* (2013.01); *G11C 11/4093* (2013.01)

(58) Field of Classification Search
CPC ... G11C 11/4091; G11C 5/06; G11C 11/4074; G11C 11/4093; G11C 7/1069; G11C 11/4096; G11C 7/1048; G11C 7/12
See application file for complete search history.

(56) References Cited

U.S. PATENT DOCUMENTS

| | | | | |
|---|---|---|---|---|
| 6,466,499 B1* | 10/2002 | Blodgett | ............ | G11C 11/4074 365/207 |
| 10,839,873 B1* | 11/2020 | Lee | ......................... | G11C 7/062 |
| 11,494,319 B1* | 11/2022 | Kim | ...................... | G06F 11/1068 |
| 2010/0110772 A1* | 5/2010 | Lee | ...................... | G11C 11/4094 365/207 |
| 2010/0157702 A1* | 6/2010 | Seo | ....................... | G11C 7/1069 365/194 |
| 2010/0315893 A1* | 12/2010 | Hong | .................... | G11C 7/1078 365/189.11 |
| 2011/0103123 A1* | 5/2011 | Nakaoka | .............. | G11C 11/4074 365/63 |
| 2014/0347945 A1* | 11/2014 | Venkata | .................... | G11C 7/12 365/205 |
| 2015/0120997 A1* | 4/2015 | Mitsubori | ............ | G11C 11/4096 711/105 |
| 2019/0392872 A1* | 12/2019 | Kawamura | ............. | G11C 7/065 |
| 2020/0152249 A1* | 5/2020 | Kawamura | ............... | G11C 7/12 |
| 2021/0201978 A1* | 7/2021 | Mazumder | ........... | G11C 11/4093 |
| 2022/0068354 A1* | 3/2022 | He | ....................... | G11C 11/4094 |

* cited by examiner

*Primary Examiner* — Mushfique Siddique
(74) *Attorney, Agent, or Firm* — Dorsey & Whitney LLP

(57) ABSTRACT

Local input/output (LIO) lines may be used for precharging and equalizing the digit lines associated with a sense amplifier. The precharge device and equalization device of the associated sense amplifier may be omitted in some examples. In some examples, an equalization device may short the lines of a LIO line pair together. The LIO line pair may drive one or more pairs of digit lines to a precharge potential. Digit lines may be connected to the LIO line pair and driven to a midpoint potential in some examples.

18 Claims, 7 Drawing Sheets

SYSTEMS, APPARATUSES, AND METHODS OF USING LOCAL INPUT/OUTPUT (LIO) LINES FOR PRECHARGING AND EQUALIZING DIGIT LINES OF SENSE AMPLIFIERS

BACKGROUND

Memory devices are structured to have one or more arrays of memory cells that are arranged, at least logically, in rows and columns. Each memory cell stores data as an electrical charge that is accessed by a digit line associated with the memory cell. A charged memory cell, when the memory cell is accessed, causes a positive change in voltage on the associated digit line, and an accessed memory cell that is not charged causes a negative change in voltage on the associated digit line. The change in voltage on the digit line may be sensed and amplified by a sense amplifier to indicate the value of the data state stored in the memory cell.

Conventional sense amplifiers are typically coupled to a pair of complementary digit lines to which a large number of memory cells are connected. As known in the art, when memory cells are accessed, a row of memory cells are activated and sense amplifiers are used to amplify a data state for the respective column of activated memory cells by coupling each of the digit lines of the selected column to voltage supplies such that the digit lines have complementary logic levels.

When a memory cell is accessed, the voltage of one of the digit lines increases or decreases slightly, depending on whether the memory cell coupled to the digit line is charged or not, resulting in a voltage difference between the digit lines. While the voltage of one digit line increases or decreases slightly, the other digit line does not and serves as a reference for the sensing operation. Respective transistors are enabled due to the voltage difference, thereby coupling the slightly higher voltage digit line to a supply voltage and the other digit line to a reference voltage, such as ground to further drive each of the digit lines to different voltages and amplify the selected digit line signal.

The digit lines are precharged during a precharge period to a precharge voltage, such as one-half of a supply voltage, so that a voltage difference can be accurately sensed and amplified during a subsequent sensing operation. Some sense amplifiers include one or more components that may improve performance of the sense amplifier, such as devices for precharging, equalization, and threshold voltage mismatch compensation.

However, increasing a number of components included in the sense amplifier may increase the size of the sense amplifier and/or reduce flexibility in sense amplifier layouts in devices.

FIG. 1 is a schematic diagram of a sense amplifier that provides threshold voltage compensation. The local data (LIO) lines and devices to selectively connect the LIO lines to the sense amplifier 100 are omitted from FIG. 1. As used herein, "connect" refers to electrically connecting two components together that may be coupled through another device which may selectively isolate the components. For example, LIO lines may be coupled to digit lines via transistors. The transistors may isolate the LIO lines from the digit lines when in a high resistance and/or off state and may electrically connect the LIO lines and the digit lines when in a low resistance and/or on state.

The sense amplifier 100 includes a first type of sensing transistors (e.g., P-channel) 110 and 111 having drains coupled to sense nodes 114 and 115, respectively. The sense amplifier 100 further includes second type of sensing transistors (e.g., N-channel) 112 and 113 having drains coupled to the nodes 114 and 115 through isolation transistors 151 and 152, all respectively. Isolation transistors 151, 152 may selectively isolate transistors 112, 113 based on a state of an isolation signal ISO. Sources of the transistors 151 and 152 are coupled to the nodes 114 and 115 and drains of the transistors 151 and 152 are coupled to the drain of the transistor 112 and the drain of the transistor 113, all respectively. Respective gates of the transistors 110 and 112 are coupled to the node 115 and respective gates of the transistors 111 and 113 are coupled to the node 114. Sources of the transistors 110 and 111 are coupled to a power supply node ACT and sources of the transistors 112 and 113 are coupled to a power supply node RNL. A digit line DL is coupled to the node 114 and a digit line/DL is coupled to the node 115.

The sense amplifier 100 further includes an equalization transistor 118 having a drain and source coupled to nodes 114 and 115, respectively, and includes a precharge transistor 119 coupled to the node 115. In this embodiment, the transistor 119 is coupled to the node 115; however, in some embodiments, the transistor 119 may be coupled to the node 114 additionally or alternatively. In some embodiments, two precharge transistors may be included, one coupled to each node 115, 114. The transistor 119 provides a voltage from its source to node 115 when activated by an active control signal BLEQ (e.g., high logic level). In some embodiments of the disclosure, the voltage VBLP is provided to the node 115 when the transistor 119 is active. Also, when activated by the active control signal BLEQ, the transistor 118 provides a conductive path between the nodes 114 and 115 to equalize the respective node voltages. In some embodiments of the disclosure, the voltage VBLP may be about 0.5V.

The sense amplifier 100 further includes voltage compensation transistors 116 and 117. The transistor 116 is coupled to the drain of the transistor 112 and the node 115 and the transistor 117 is coupled to the drain of the transistor 113 and the node 114. The transistors 116 and 117 are activated by an active compensation control signal BLECP (e.g., active high logic level).

While sense amplifier 100 is provided as an example, other sense amplifier designs for threshold voltage compensation also exist, some of which include more devices than the sense amplifier 100. For example, the sense amplifiers described in U.S. Pat. Nos. 8,598,912, 10,236,036, 10,943,644, and 11,152,055 may provide threshold voltage compensation. While these sense amplifiers may provide improved performance compared to sense amplifiers with fewer components, these sense amplifiers may require additional devices for providing the improved performance as well as the signal lines required for controlling the devices. This may increase the size of the sense amplifiers and/or impose layout restrictions when placing the sense amplifiers in a device. Accordingly, a sense amplifier with a smaller size and/or reduced layout restrictions may be desired in some applications.

DETAILED DESCRIPTION

According to embodiments of the present disclosure, local input/output (LIO) lines (e.g., local data lines) may be used for precharging and equalizing the digit lines associated with a sense amplifier. The precharge device and equalization device of the associated sense amplifier (e.g., transistors 119 and 118) may be omitted, and the sense amplifier may still provide threshold voltage compensation and/or other performance improvements. In some applications, removing the precharge and equalization devices may reduce the components required in the sense amplifier and/or mitigate the increase in layout requirements.

Figure 2:
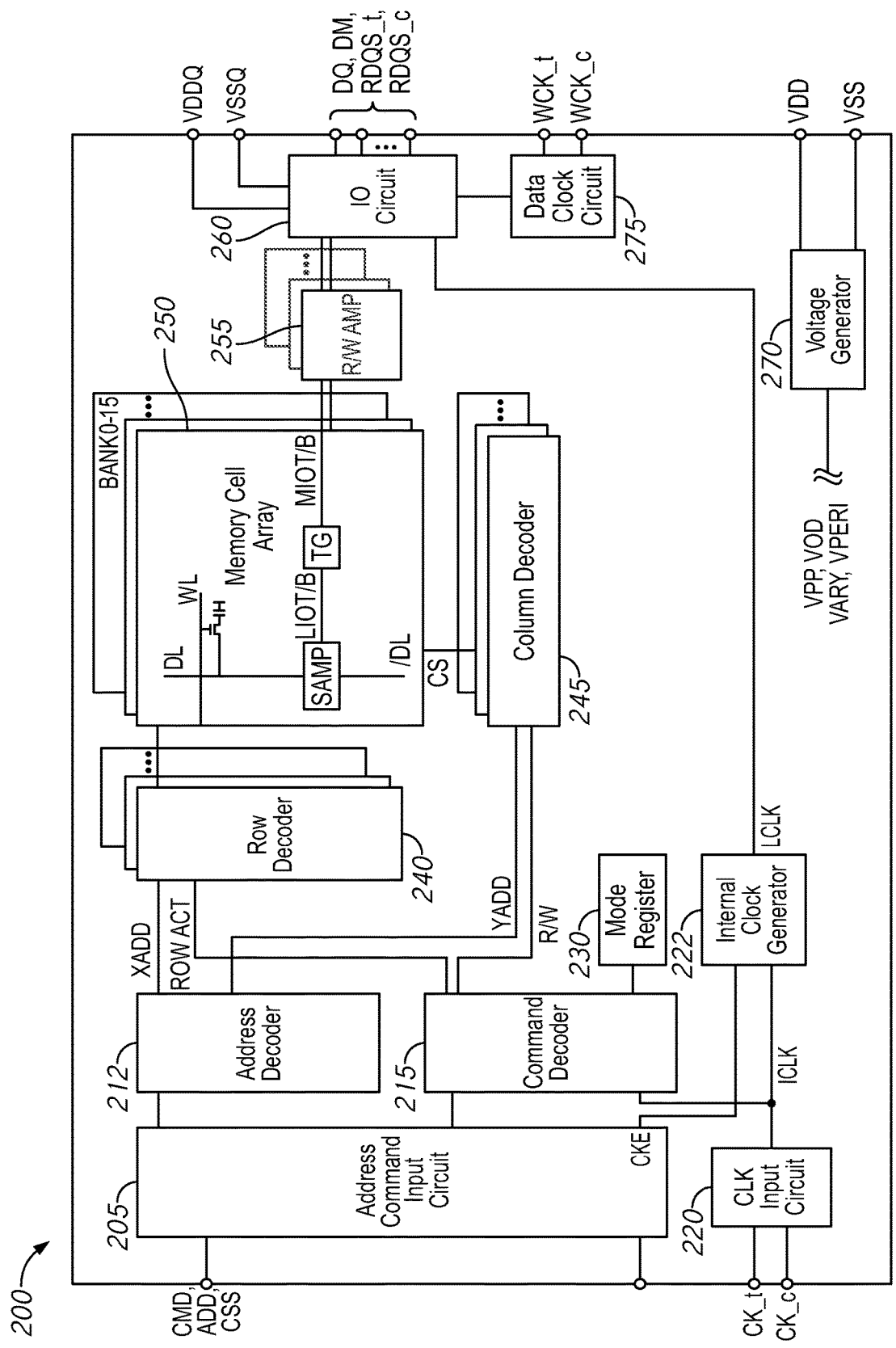
FIG. 2 is a block diagram of an apparatus according to at least one embodiment of the disclosure.

FIG. 2 is a block diagram of an apparatus according to at least one embodiment of the disclosure. The apparatus may be a semiconductor device 200, and will be referred to as such. The semiconductor device 200 may include, without limitation, a DRAM device, The semiconductor device 200 may be integrated into a single semiconductor chip in some embodiments of the disclosure.

Figure 1:
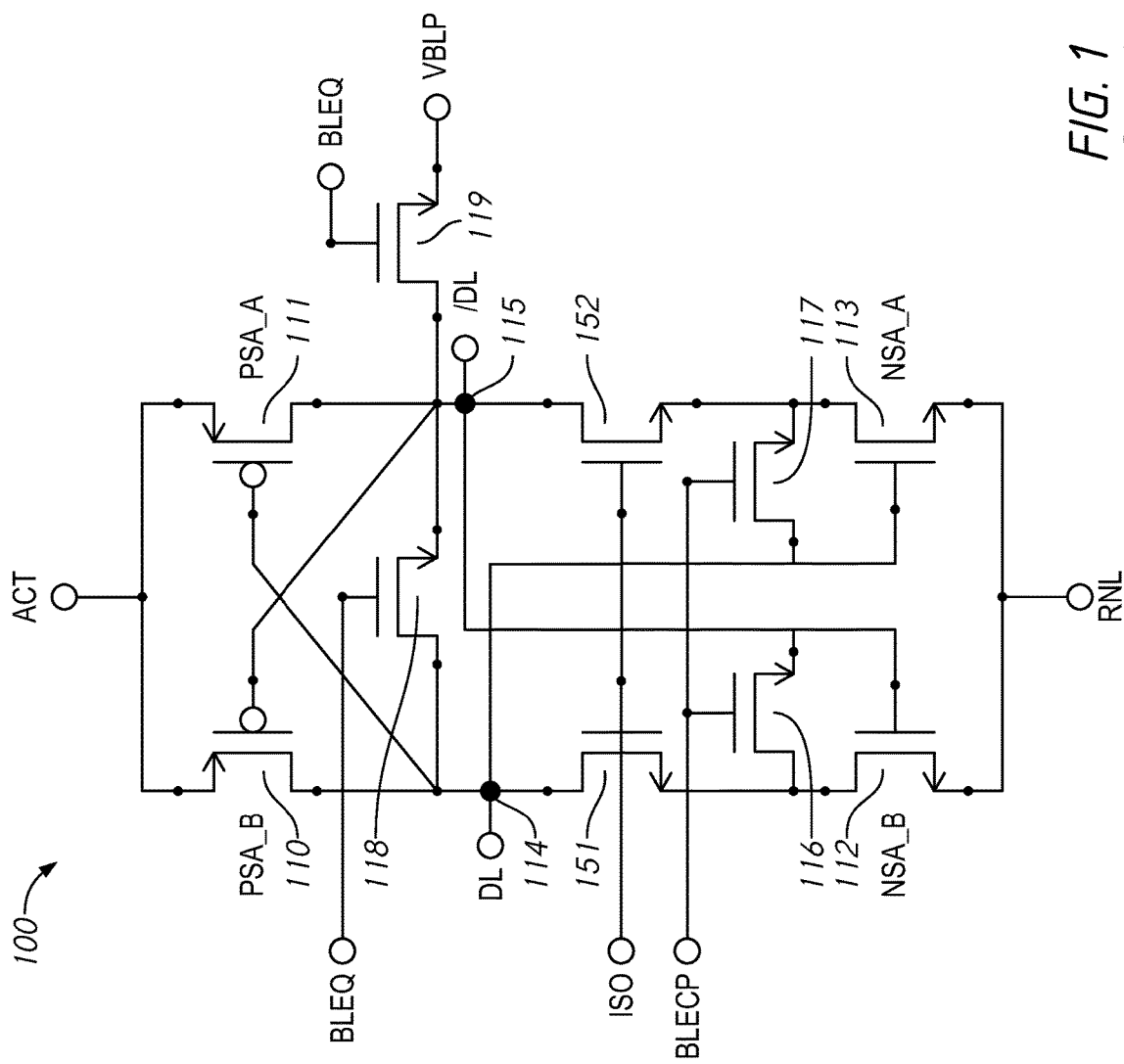
FIG. 1 is a circuit diagram of a sense amplifier circuit that provides threshold voltage compensation.

The semiconductor device 200 includes a memory array 250. The memory array 250 is shown as including a plurality of memory banks. In the embodiment of FIG. 2, the memory array 250 is shown as including sixteen memory banks BANK0-BANK15, however memory array 250 may have more or fewer memory banks in other examples (e.g., 4, 8, 32). Each memory bank includes a plurality of word lines WL, a plurality of bit lines BL and/BL, and a plurality of memory cells MC arranged at intersections of the plurality of word lines WL and the plurality of digit lines DL and/DL. Selection of the word line WL is performed by a row decoder 240 and selection of the digit lines DL and/DL is performed by a column decoder 245. In the embodiment of FIG. 1, the row decoder 240 includes a respective row decoder for each memory bank and the column decoder 245 includes a respective column decoder for each memory bank. The digit lines DL and/DL (e.g., bit lines) are coupled to a respective sense amplifier (SAMP). Read data from the digit line DL or/DL is amplified by the sense amplifier SAMP, and transferred to read/write amplifiers 255 over complementary local data lines (LIOT/B), transfer gate (TG), and complementary main data lines (MIOT/B). Conversely, write data outputted from the read/write amplifiers 255 is transferred to the sense amplifier SAMP over the complementary main data lines MIOT/B, the transfer gate TG, and the complementary local data lines LIOT/B, and written in the memory cell MC coupled to the bit line BL or/BL.

In some applications, the number of sense amplifiers for each bank may equal a number of columns in each bank. Although only one sense amplifier SAMP is shown in FIG. 2, semiconductor device 200 may include hundreds or thousands of sense amplifiers. In some examples, each sense amplifier SAMP may be coupled to a corresponding local data line pair LIOT/B. In some examples, sense amplifiers SAMP may be selectively coupled to a local data line pair LIOT/B. In some of these examples, there may be fewer local data line pairs LIOT/B than sense amplifiers SAMP.

According to embodiments of the present disclosure, a local data line pair LIOT/B may be selectively connected to a sense amplifier SAMP by a column select signal CS, which may be provided by column decoder 245 in some embodiments. For example, local data line LIOT may be connected to digit line DL and local data line LIOB may be connected to digit line/DL associated with sense amplifier SA. The local data line pair LIOT/B may be selectively connected (e.g., shorted) together. That is, a local data line LIOT may be connected to a local data line LIOB. When the local data line pair LIOT/B are connected together, the resulting potential on the local data line pair LIOT/B may be a potential at approximately the midpoint of the potentials of the digit lines DL and/DL, referred to as a midpoint potential. When the digit lines DL and/DL are connected to the local data line pair LIOT/B, the digit lines DL and/DL may be driven to the midpoint potential. Optionally, in some embodiments, a digit precharge voltage circuit (not shown in FIG. 1) may provide a midpoint potential to the local data line pair LIOT/B to urge the digit lines to approach the midpoint potential.

The semiconductor device 200 may employ a plurality of external terminals that include command and address and chip select (CA/CSS) terminals coupled to a command and address bus to receive commands and addresses, and a chip select CSS signal. The external terminals may further include clock terminals to receive clocks CK_t and CK_c, and data clocks WCK_t and WCK_c, and to provide access data clocks RDQS_t and RDQS_c, data terminals DQ, data mask terminal DM, and power supply terminals to receive power supply potentials VDD, VSS, VDDQ, and VSSQ.

The clock terminals are supplied with external clocks CK_t and CK_c that are provided to an input buffer 220. The external clocks may be complementary. The input buffer 220 generates an internal clock ICLK based on the CK_t and CK_c clocks. The ICLK clock is provided to the command decoder 215 and to an internal clock generator 222. The internal clock generator 222 provides various internal clocks LCLK based on the ICLK clock. The LCLK clocks may be used for timing operation of various internal circuits. Data clocks WCK_t and WCK_c are also provided to the external clock terminals. The WCK_t and WCK_c clocks are provided to a data clock circuit 275, which generates internal data clocks based on the WCK_t and WCK_c clocks. The internal data clocks are provided to the input/output circuit 260 to time operation of circuits included in the input/output circuit 260 to time the receipt of write data.

The CA/CSS terminals may be supplied with memory addresses. The memory addresses supplied to the CA/CSS terminals are transferred, via a command/address input circuit 205, to an address decoder 212. The address decoder 212 receives the address and supplies a decoded row address XADD to the row decoder 240 and supplies a decoded column address YADD to the column decoder 245. The CA/CSS terminals may be supplied with commands. Examples of commands include access commands for accessing the memory, such as read commands for performing read operations and write commands for performing write operations, mode register write and read commands for performing mode register write and read operations, as well as other commands and operations.

The commands may be provided as internal command signals to a command decoder 215 via the command/address input circuit 205. The command decoder 215 includes circuits to decode the internal command signals to generate various internal signals and commands for performing operations. For example, the command decoder 215 may provide a row command signal ROWACT to select a word line and a column command signal R/W to select a bit line.

The power supply terminals are supplied with power supply potentials VDD and VSS. The power supply potentials VDD and VSS are supplied to an internal voltage generator circuit 270. The internal voltage generator circuit 270 generates various internal potentials VPP, VOD, VARY, VPERI, and the like based on the power supply potentials VDD and VSS supplied to the power supply terminals. The internal potential VPP is mainly used in the row decoder 240, the internal potentials VOD and VARY are mainly used in the sense amplifiers SAMP included in the memory array 250, and the internal potential VPERI is used in many peripheral circuit blocks.

The power supply terminals are also supplied with power supply potentials VDDQ and VSSQ. The power supply potentials VDDQ and VSSQ are supplied to the input/output circuit 260. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 260 so that power supply noise generated by the input/output circuit 260 does not propagate to the other circuit blocks.

When an activate command and a row address are received, followed by a read command and a column address, read data is read from memory cells in the memory array 250 corresponding to the row address and column address. The read command is received by the command decoder 215, which provides internal commands so that read data from the memory array 250 is provided to the read/write amplifiers 255. The read data is provided to the input/output circuit 260 and output to the data terminals DQ. When an activate command and a row address are received, followed by a write command and a column address, write data supplied to the data terminals DQ is written to a memory cells in the memory array 250 corresponding to the row address and column address. A data mask may be provided to the data mask terminals DM to mask portions of the data when written to memory. The write command is received by the command decoder 215, which provides internal commands so that the write data is received by input receivers in the input/output circuit 260. The write data is supplied from the data terminals DQ via the input/output circuit 260 to the read/write amplifiers 255, and by the read/write amplifiers 255 to the memory array 250 to be written into the memory cell MC. Read and write may be provided to the DQ terminals connection with one or more clock signals, such as data clocks WCK_t and WCK_c, and to provide access data clocks RDQS_t and RDQS_c.

Figure 3:
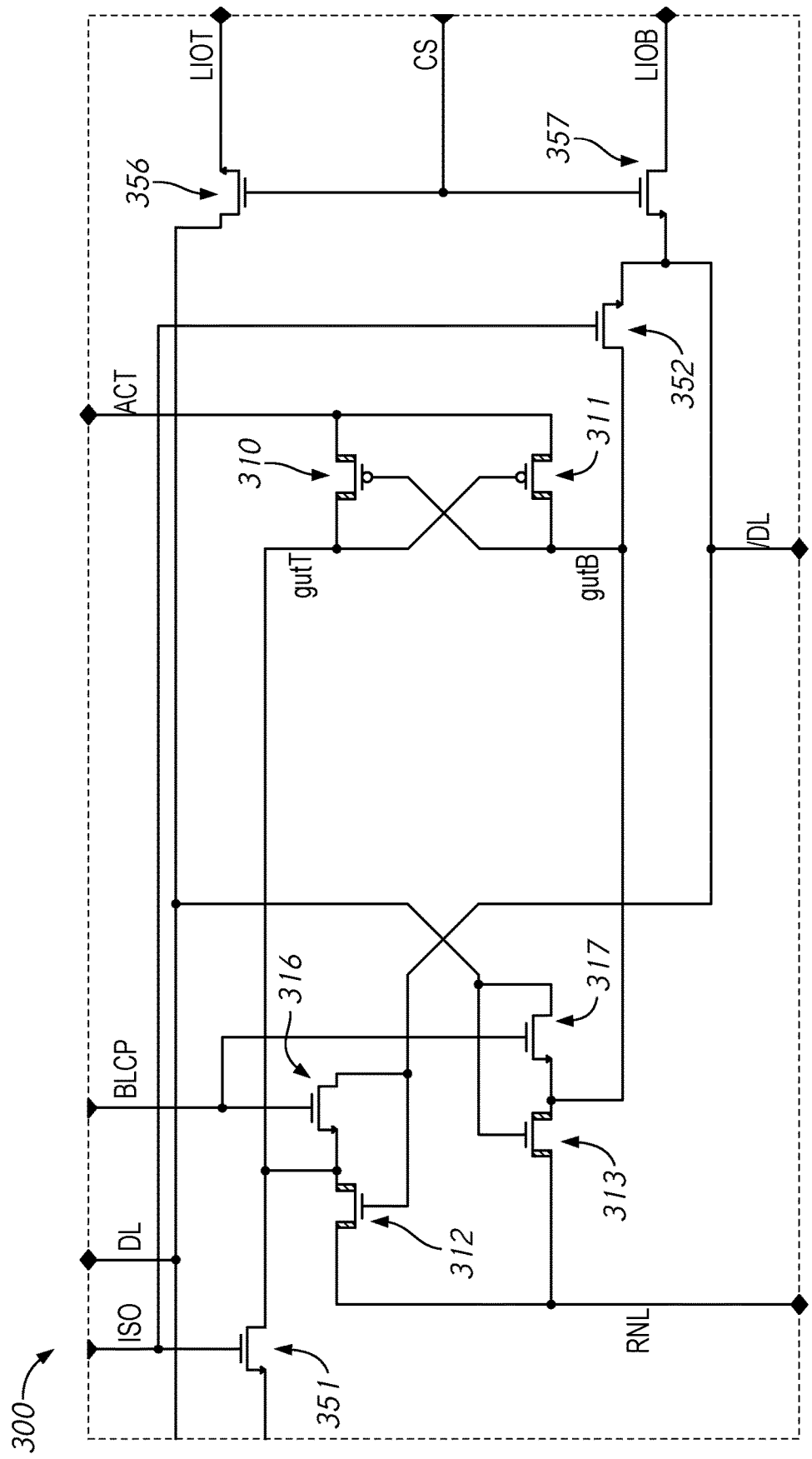
FIG. 3 is a circuit diagram of a sense amplifier according to at least one embodiment of the disclosure.

FIG. 3 is a circuit diagram of a sense amplifier according to at least one embodiment of the disclosure. In some embodiments, the sense amplifier 300 may be used to implement the sense amplifier SAMP shown in FIG. 2. The sense amplifier 300 may include sensing devices 310-313, isolation devices 351 and 352, and voltage compensation devices 316, 317. Also shown in FIG. 3 are devices 356 and 357, which selectively connect the digit lines DL and/DL to a LIO pair LIOT and LIOB, which may correspond to LIO pair LIOT/B shown in FIG. 2 in some embodiments.

Sensing devices 310-313 may correspond to sensing transistors 110-113 of sense amplifier 100 shown in FIG. 1 in some embodiments, voltage compensation devices 316, 317 may correspond to voltage compensation transistors 116, 117, respectively. Similarly, in some embodiments, isolation devices 351, 352 may correspond to isolation transistors 151, 152. In some embodiments, sense amplifier 300 may be the same as sense amplifier 100 except that equalization transistor 118 and precharge transistor 119 are omitted.

As shown in FIG. 3, the digit line DL may be selectively connected to local data line LIOT by device 356 and digit line/DL may be selectively connected to local data line LIOB by device 357. In some embodiments, devices 356 and 357 may be N-channel transistors, but other devices or transistor types may be used in other examples. The gates of devices 356, 357 may receive a column select signal CS. When the column select CS signal is in an active high state, the devices 356, 357 may be in an active (e.g., 'on') state, and the digit lines may be connected to the LIO lines. When the CS signal is in an inactive low state, the devices 356, 357 may be in an inactive (e.g., 'off') state, and the digit lines may be disconnected from the LIO lines.

Figure 4:
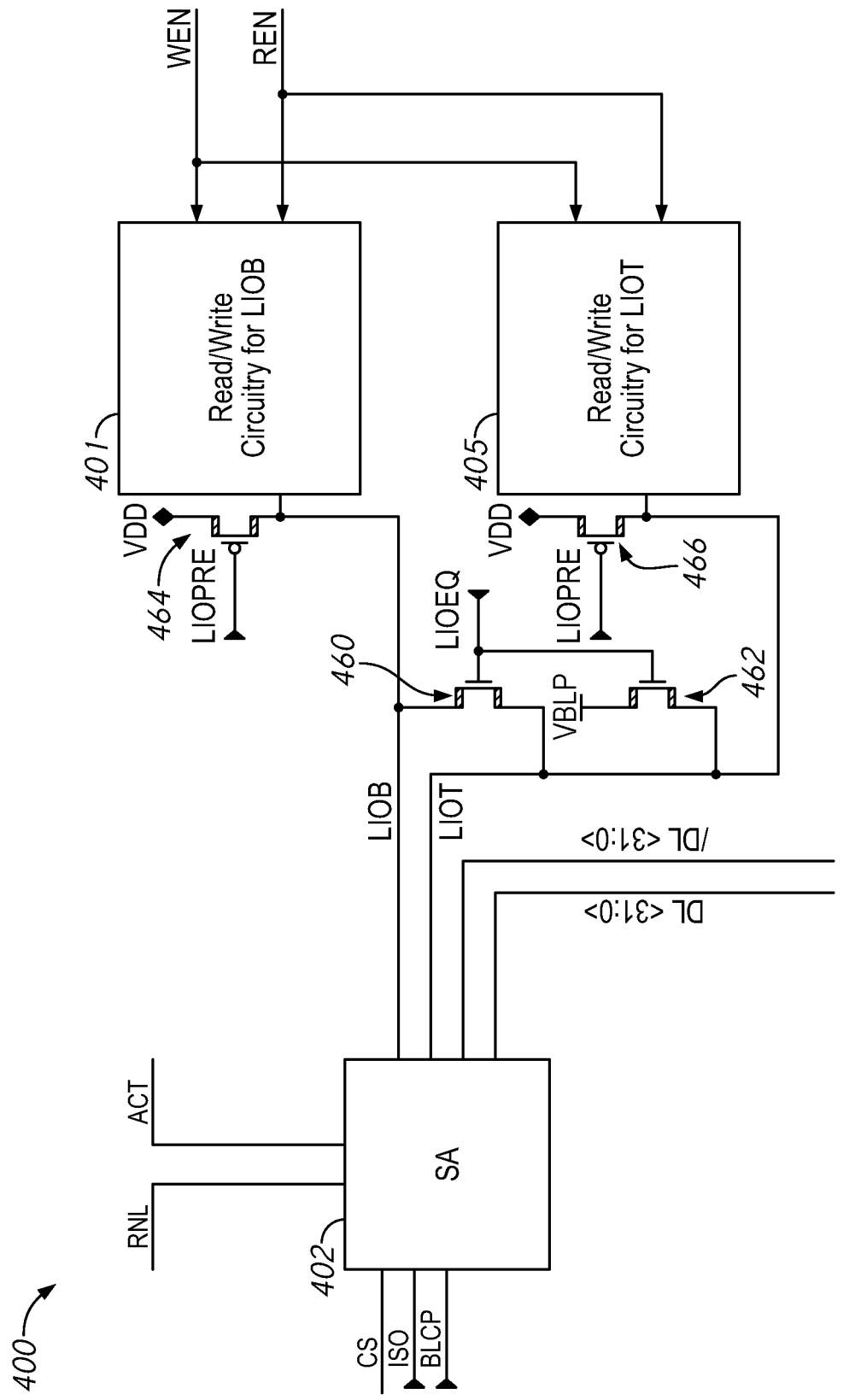
FIG. 4 is a circuit diagram of at least a portion of a semiconductor device according to at least one embodiment of the disclosure.

FIG. 4 is a circuit diagram of at least a portion of a semiconductor device according to at least one embodiment of the disclosure. Semiconductor device 400 may be included in semiconductor device 200 shown in FIG. 2. In the portion shown in FIG. 4, semiconductor device 400 may include a sense amplifier block SA 402, an equalization device 460, a digit precharge voltage circuit (DPVC) 462, LIO precharge devices 464, 466, and read/write circuitry 401, 405. In some embodiments, the semiconductor device 400 may use local data LIO lines to precharge and equalize digit lines coupled to the sense amplifiers.

Sense amplifier block SA 402 may include one or more sense amplifiers, such as sense amplifier 300 shown in FIG. 3. In the example shown in FIG. 4, sense amplifier block SA 402 includes 32 sense amplifiers, but more or fewer sense amplifiers may be included in sense amplifier block 402 in other examples. Each of the sense amplifiers of sense amplifier block SA 402 may receive a corresponding column select signal CS <31:0>, an isolation signal ISO, and a compensation control signal BLCP. Each sense amplifier of sense amplifier block SA 402 may be coupled to a power supply node ACT and a power supply node RNL. Each of the sense amplifiers may be coupled to a corresponding digit line pair DL <31:0>/DL <31:0>. In the example shown in FIG. 4, each of the sense amplifiers may be coupled to a LIO line pair LIOT/B (e.g., by turning devices 356 and 357 on and off). However, in other examples, each sense amplifier of sense amplifier block SA 402 may be coupled to a corresponding LIO line pair (e.g., LIOT<31:0>, LIOB<31:0>).

Local data line LIOB may be coupled between the sense amplifier block SA 402 and read/write circuitry 401. Local data line LIOB may be further coupled to LIO precharge device 464. LIO precharge device 464 may be coupled between LIOB and a potential (VDD in the example shown in FIG. 4). In some embodiments, such as the one shown in FIG. 4, LIO precharge device 464 may be a P-channel transistor. A gate of the LIO precharge device 464 may receive a precharge signal LIOPRE. When the precharge signal LIOPRE is active low, LIO precharge device 464 may be active, and LIOB may be driven to the potential VDD. When the precharge signal LIOPRE is inactive high, LIO precharge device 464 may be inactive, and LIOB is no longer driven to the potential VDD.

Local data line LIOT may be coupled between the sense amplifier block SA 402 and read/write circuitry 405. Local data line LIOT may be further coupled to LIO precharge device 466. LIO precharge device 464 may be coupled between LIOT and a potential (VDD in the example shown in FIG. 4). In some embodiments, such as the one shown in FIG. 4, LIO precharge device 466 may be a P-channel transistor. A gate of the LIO precharge device 466 may receive a precharge signal LIOPRE. When the precharge signal LIOPRE is active low, LIO precharge device 466 may be active, and LIOT may be driven to the potential VDD. When the precharge signal LIOPRE is inactive high, LIO precharge device 466 may be inactive, and LIOT is no longer driven to the potential VDD.

Read/write circuitry 401 and 405 may be implemented by known read/write circuitry in some embodiments. In some embodiments, read/write circuitry 401 and/or 405 may include one or more circuits such as a transfer gate (e.g., TG in FIG. 2), a read/write amplifier such as R/W AMP 255, and/or at least a portion of an IO circuit, such as IO circuit 260. The read/write circuitry 401 and 405 may be controlled, at least in part, by read and write enable signals REN, WEN. Portions of read/write circuitry 401, 405 used for read operations (e.g., when a read command is received by semiconductor device 400) may be enabled when an active REN signal is received and disabled when an inactive REN signal is received. Portions of read/write circuitry 401, 405 used for write operations (e.g., when a write command is received by semiconductor device 400) may be enabled when an active WEN signal is received and disabled when an inactive WEN signal is received.

The equalization device 460 may be coupled between LIOT and LIOB of the LIO pair. In some examples, such as the one shown in FIG. 4, the equalization device 460 may be an N-channel transistor. The equalization device 460 may receive an equalization control signal LIOEQ at a gate. When the equalization control signal LIOEQ is in an active high state, equalization device 460 may be active and connect (e.g., short) LIOT and LIOB together. When LIOT and LIOB are connected to respective digit lines DL <31:0> and /DL<31:0> and shorted together by equalization device 460, the digit lines may be driven to a potential equal to or approximately equal (e.g., within 10%, within 20%) to a midpoint potential such as VDD/2, for example. In some embodiments, the midpoint potential may correspond to a desired precharge potential of the digit lines DL<31:0>, /DL<31:0>.

While ideally, shorting LIOB and LIOT together with equalization device 460 causes the digit line pairs to equalize to a midpoint potential, in some applications, the LIOB and LIOT may not equalize the digit lines at the desired midpoint (and/or equalize within a desired time) due to variations in potential and/or other properties of the individual digit lines. Optionally, in some examples, such as the one shown in FIG. 4, a DPVC 462 may be included to "urge" LIOB and LIOT, and thus the digit lines, to the desired midpoint potential. The DPVC 462 may be coupled to LIOT and/or LIOB (coupled to LIOT and coupled to LIOB through equalization device 460 in the example shown in FIG. 4) and a midpoint potential VBLP (which may be equal to VDD/2 in some embodiments). In some examples, such as the one shown in FIG. 4, the DPVC 462 may include an N-channel transistor. The DPVC 462 may receive the equalization control signal LIOEQ at a gate. When LIOEQ is active high, the DPVC 462 may connect the midpoint potential VBLP to the shorted LIO line pair.

In some examples, VDD may be 0.9V and VBLP may be 0.45V. Other voltages may be used in other examples. The voltage levels selected may be based, at least in part, on a desired precharge potential of the LIO lines and/or digit lines. The voltage levels selected may be based, at least in part, on a type of device that includes semiconductor device 400. For example, higher voltages may be used in electronic devices intended to remain coupled to a power source (e.g., power outlet) whereas lower voltages may be used in battery-powered devices (e.g., mobile phones, tablets).

In operation, when pre-charging of a digit line pair is desired (e.g., after a write operation), the column select CS signal associated with the digit line pair is activated (or remains activated if the digit line pair is associated with a selected sense amplifier) to connect the digit line pair to the corresponding LIO pair and the equalization control signal LIOEQ may be activated (e.g., active high) to cause equalization device 460 to be in an active state to connect LIO lines LIOB and LIOT to one another. As noted above, this causes LIOB and LIOT to drive (e.g., pull) the digit lines to (or approximately to) a midpoint voltage. In embodiments including the DPVC 462, the active LIOEQ signal may cause the DPVC 462 to be in an active state, which may connect the LIO line pair to a midpoint voltage VBLP. The digit lines are driven to the midpoint potential VBLP, which may correspond to a desired precharge potential of the digit lines.

Optionally, device 460, device 462, LIOEQ, and/or one or more CS signals may be driven to a higher voltage (e.g., higher than VDD). In some applications, this may decrease the time required to pre-charge the digit lines. In some embodiments, the higher voltage may be 0.5 V higher than the voltage of VDD. For example, if VDD is 0.9V, device 460, device 462, LIOEQ, and/or one or more CS signals may be driven to 1.4V.

By using the LIO lines to precharge the digit lines, the sense amplifiers of sense amplifier block SA 402 may not include equalization and precharge devices, such as shown in sense amplifier 300 of FIG. 3. Thus, the sense amplifiers of sense amplifier block SA 402 and sense amplifier 300 may include fewer components compared to other sense amplifiers, such as sense amplifier 100 shown in FIG. 1. This may reduce the layout size of the sense amplifiers and/or reduce layout restrictions of the sense amplifiers (e.g., provide more flexibility in arranging the sense amplifiers of sense amplifier block SA 402). The semiconductor device 400 may have a reduced layout size overall in some embodiments. For example, in embodiments where the LIO pair is shared by multiple sense amplifiers, the equalization device may be shared amongst multiple sense amplifiers, reducing the total number of equalization devices in semiconductor device 400. In some embodiments, the precharge devices of the LIO lines may be pre-existing precharge devices used to precharge the LIO lines. Thus, no additional precharge devices may be required by semiconductor device 400 compared to existing semiconductor devices in these embodiments.

Figure 5:
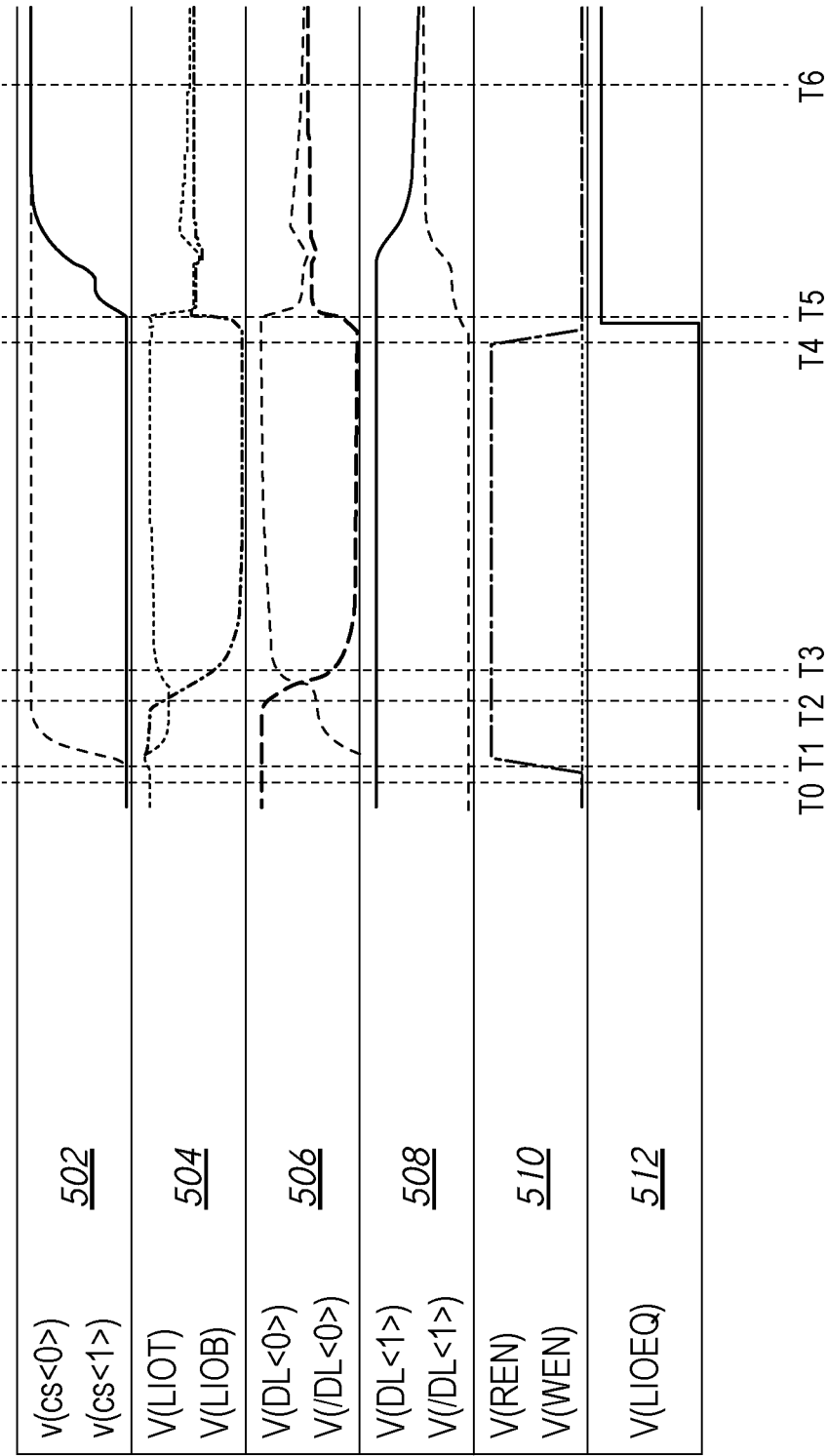
FIG. 5 is a timing diagram illustrating states of various signals of a semiconductor device according to at least one embodiment of the disclosure.

FIG. 5 is a timing diagram illustrating states of various signals of a semiconductor device according to at least one embodiment of the disclosure. The signals and the states shown in timing diagram 500 may illustrate the signals and relative states of a semiconductor device, or a portion thereof, such as semiconductor device 200, semiconductor device 400, and/or sense amplifier 300, which may be included in semiconductor device 200 and/or 400 in some embodiments. While reference will be made to semiconductor device 400 and sense amplifier 300 in describing the timing diagram 500, the signals and the states illustrated in timing diagram 500 may not be limited to the specific examples shown in FIGS. 3 and 4. Furthermore, the operations and/or order of operations in timing diagram 500 are provided merely as examples, and other operations or order of operations may be performed in other examples.

In the top plot 502 of timing diagram 500, V (CS<0>) and V(CS<1>) illustrate the states of two bits of a multi-bit column address signal CS. In some embodiments, each bit of the CS signal may go to a different sense amplifier of a sense amplifier block, such as sense amplifier 300 and sense amplifier block SA 402. Plot 504 illustrates the states of LIO lines of a LIO pair, V(LIOT) and V(LIOB), which may be selectively connected to digit lines of one or more sense amplifiers. Plot 506 includes V(DL<0>) and V(/DL<0>) which illustrate the states of digit lines of a digit line pair coupled to a sense amplifier receiving the CS<0> signal. Plot 508 includes V(DL<1>) and V(/DL<1>) illustrating the states of digit lines of a digit line pair coupled to a sense amplifier receiving the CS<1> signal. In plot 510, V(REN) and V(WEN) indicate the states of read and write enable signals, respectively. The read and write enable signals may be provided to read/write circuitry, such as read/write circuitry 401 and 405. The bottom plot 512 of timing diagram 500, V(LIOEQ) indicates the state of an equalization control signal that activates an equalization device and DPVC, such as equalization device 460 and DPVC 462.

At or before time T0, the signals of timing diagram 500 may be in states reflecting a prior access operation, for example, a read operation that was initiated prior to time T0. For example, the levels of the digit lines DL<0> and/DL<0> may reflect levels from accessing of an associated row of a memory array. In the example shown in FIG. 5, a write operation is performed as indicated by the activation of the WEN signal at or around time T0. Although not shown in timing diagram 500, the WEN signal may be activated responsive to a write command received by a semiconductor device, such as semiconductor device 200 and/or 400. The activated WEN signal may enable write components of read/write circuitry, such as read/write circuitry 401, 405.

The column select signal associated with a sense amplifier may be activated at or around time T1, responsive, at least in part, to the write command. Although in the example in FIG. 5 shows the column select signal activated at or around time T1, in some embodiments, the column select signal may be activated prior to T1 such as at or around T0. In the example shown in plot 504, CS<0> is activated, corresponding to a selected sense amplifier. The column select signal CS<1> may be associated with non-selected sense amplifiers, and remains inactive. Which column select signal is activated may be based, at least in part, on an address (not shown) received with the write command.

Although not shown in timing diagram 500, data to be written to a memory cell associated with the selected sense amplifier may be received by the semiconductor device and provided to the associated LIO line pair via read/write circuitry. At or around time T2, the LIO lines LIOT and LIOB are driven to states indicative of the data to be written to the memory cell. In the example shown in FIG. 5, LIOT is driven low and LIOB is driven high. Because CS<0> is activated, the digit lines DL<0> and/DL<0> are connected to LIOT and LIOB. Thus, the digit lines DL<0> and/DL<0> are driven to states corresponding to LIOT and LIOB, respectively beginning at or around time T3. Digit lines DL<1> and/DL<1>, which are coupled to a non-selected sense amplifier, remain in their prior states.

After data has been written to the memory cell in accordance with the write operation, the write enable signal WEN may transition to an inactive state at or around time T4. This may disable write components of the read/write circuitry.

At or around time T5, the equalization control signal LIOEQ may be activated responsive, at least in part, to the end of the write operation and/or receipt of a precharge command (not shown in FIG. 5). The active LIOEQ signal may activate an equalization device, such as equalization device 460. The equalization device 460 may short the LIO lines of the LIO pair together. The connecting of the LIO lines together may drive the LIO lines LIOT and LIOB to a midpoint potential at or around time T5. Optionally, in some embodiments, the LIOEQ may further activate a digit precharge voltage circuit (DPVC), such as DPVC 462, which may connect the LIO pair to the midpoint potential.

Because CS<0> remains active, digit lines DL<0> and/DL<0> remain connected to LIOT and LIOB, respectively. Accordingly, beginning at or around time T5, the digit lines DL<0> and/DL<0> may be driven toward the midpoint potential and reach the midpoint potential (or approximately the midpoint potential) at or around time T6 to be precharged.

In some embodiments, responsive to the end of the write operation and/or receipt of a precharge command, the column select signals CS associated with unselected sense amplifiers may be activated. As shown in the example of FIG. 5, at or around time T5, CS<1> is activated. This may connect digit lines DL<1> and/DL<1> associated with non-selected sense amplifiers to LIOT and LIOB. Thus, digit lines DL<1> and/DL<1> may be driven toward the midpoint potential at or around time T5 and reach the midpoint potential (or approximately the midpoint potential) at or around time T6 to be precharged. Although only one non-selected column select signal and digit line pair are shown in timing diagram 500, additional non-selected sense amplifiers with corresponding column select signals and digit line pairs may be present. In some embodiments, some or all of the associated column select signals and digit line pairs of the non-selected sense amplifiers may perform the same or similarly to CS<1>, DL<1> and/DL<1>. Although in the example in FIG. 5 shows the column select signal activated at or around time T5, in some embodiments, the column select signal may be activated prior to time T5 such as at or around T4.

Figure 6:
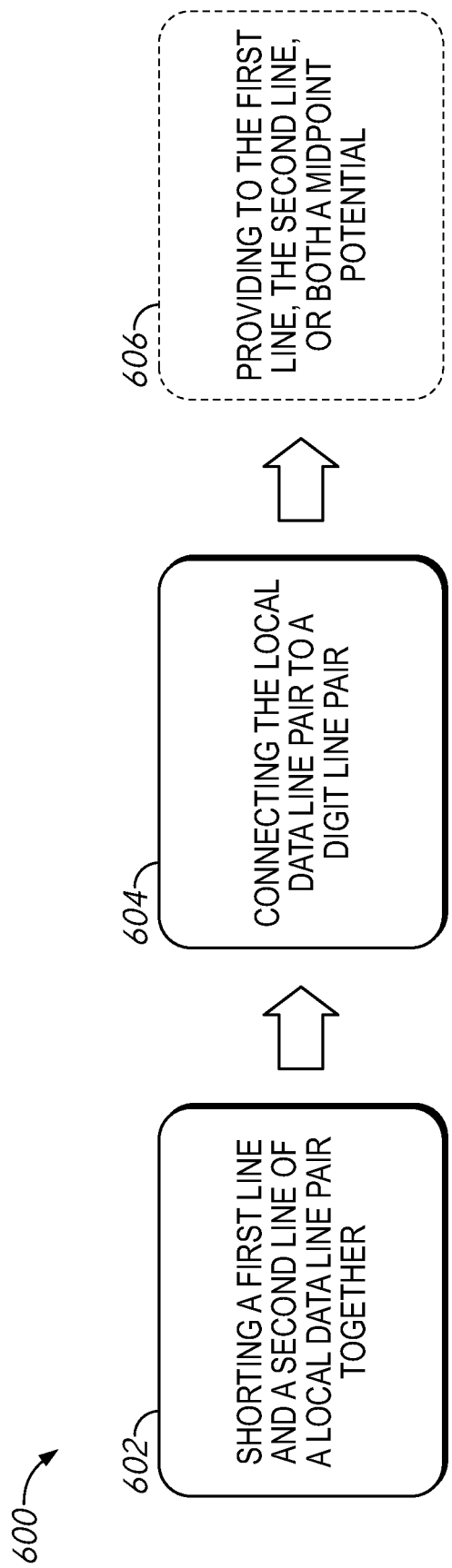
FIG. 6 is a flow chart of a method according to at least one embodiment of the disclosure.

FIG. 6 is a flow chart of a method according to at least one embodiment of the disclosure. The method 600 may be performed in whole or in part by a semiconductor device, such as semiconductor device 200 and/or 400.

At block 602 "shorting a first line and a second line of a local data line pair together" may be performed. In some embodiments, local data line pair may include local data lines LIOT and LIOB shown in FIGS. 2-4. In some embodiments, shorting may be performed by an equalization device, such as equalization device 460.

At block 604, "connecting the local data line pair to a digit line pair" may be performed. In some embodiments, the connecting may be performed by one or more devices, such as devices 356 and 357. In some embodiments, the digit line pair is connected to the local data line pair responsive to activation of a column select signal CS. In some embodiments, the column select signal is activated, based, at least in part, on an address associated with an access command. Additionally or alternatively, in some embodiments, at block 604, "connecting the local data line pair to a plurality of digit line pairs" may be performed. For example, multiple digit line pairs associated with multiple sense amplifiers, such as the sense amplifiers of sense amplifier block SA 402. Although block 604 is shown as following block 602, in some embodiments, block 604 may precede and/or performed concurrently, at least in part, with block 602.

In some embodiments, shorting the first line and the second line together drive the first line and the second line to a third potential equal to a midpoint between the first potential and the second potential. In some embodiments, third potential is equal to a digit line precharge potential.

Optionally, in some embodiments, method 600 may further include "providing to the first line, the second line, or both a midpoint potential" as indicated by block 610. In some embodiments, the midpoint potential may be provided by connecting the local data lines to the midpoint potential by activating a digit precharge voltage circuit (DPVC), such as DPVC 462. Although shown following block 604, in some embodiments, block 606 may be performed prior to block 604 and/or block 602, or at least partially concurrently with block 602 and/or 604.

Figure 7:
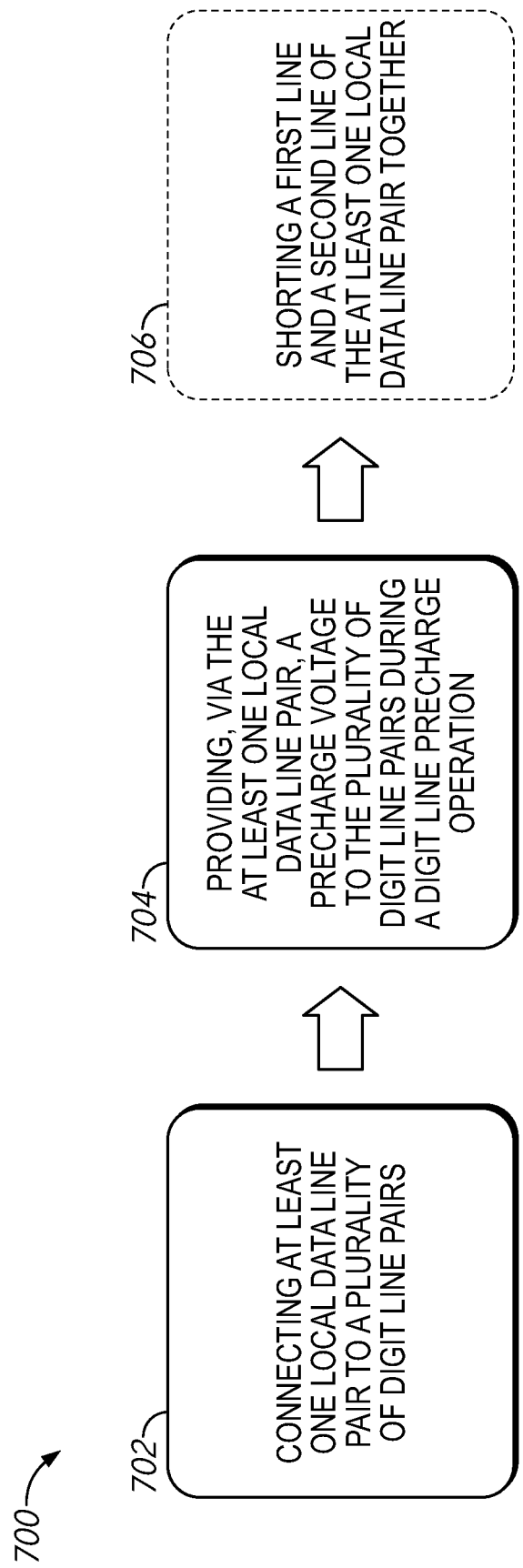
FIG. 7 is a flow chart of a method according to at least one embodiment of the disclosure.

FIG. 7 is a flow chart of a method according to at least one embodiment of the disclosure. The method 700 may be performed in whole or in part by a semiconductor device, such as semiconductor device 200 and/or 400.

At block 702, "connecting at least one local data line pair to a plurality of digit line pairs" may be performed. In some embodiments, local data line pair may include local data lines LIOT and LIOB shown in FIGS. 2-4. In some embodiments, the digit line pairs may include digit line pairs DL and/DL and/or DL<31:0>/DL<31:0>. In some embodiments, the connecting may be performed by one or more devices, such as devices 356 and 357. In some embodiments, the digit line pair is connected to the local data line pair responsive to activation of a column select signal CS. In some embodiments, the column select signal is activated, based, at least in part, on an address associated with an access command.

At block 704, "providing, via the at least one local data line pair, a precharge voltage to the plurality of digit line pairs during a digit line precharge operation" may be performed. In some embodiments, providing the precharge voltage comprises connecting the at least one local data line pair to the precharge voltage. In some embodiments, the precharge voltage may be a midpoint voltage, such as VDD/2 and/or VBLP. In some embodiments, the precharge voltage may be provided by activating a digit precharge voltage circuit (DPVC), such as DPVC 462.

Optionally, in some embodiments, method 700 may further include "shorting a first line and a second line of the at least one local data line pair together" as indicated by block 706. In some embodiments, shorting may be performed by an equalization device, such as equalization device 460. Although shown following block 704, in some embodiments, block 706 may be performed prior to block 704 and/or block 7602, or at least partially concurrently with block 702 and/or 704.

The apparatuses, systems, and methods disclosed herein may utilize local data LIO lines for precharging and equalizing digit lines associated with a sense amplifier. This may allow the precharge device and equalization device of the associated sense amplifier to be omitted. In some applications, removing the precharge and equalization devices may reduce the components required in the sense amplifier and/or mitigate increase in layout requirements.

Certain details are set forth herein to provide a sufficient understanding of examples of the disclosure. However, it will be clear to one having skill in the art that examples of the disclosure may be practiced without these particular details. Moreover, the particular examples of the present disclosure described herein should not be construed to limit the scope of the disclosure to these particular examples. In other instances, well-known circuits, control signals, timing protocols, and software operations have not been shown in detail in order to avoid unnecessarily obscuring the disclosure. Additionally, terms such as "couples" and "coupled" mean that two components may be directly or indirectly electrically coupled. Indirectly coupled may imply that two components are coupled through one or more intermediate components.

What is claimed is:

1. An apparatus comprising:
   a first digit line pair;
   a first sense amplifier coupled to the first digit line pair,
   a second digit line pair;
   a second sense amplifier coupled to the second digit line pair;
   a local data line pair configured to be selectively connected to the first sense amplifier and the second sense amplifier;
   an equalization device consisting of a single transistor coupled between a first line and a second line of the local data line pair, wherein the equalization device is configured to selectively connect the first line and the second line together and the equalization device is shared by the first and the second sense amplifiers; and
   a digit precharge voltage circuit consisting of a single transistor configured to selectively connect the first line, the second line, or both to a midpoint potential, the digit precharge voltage circuit coupled to the first line of the local data line pair through the equalization device and the digit precharge voltage circuit coupled to the second line of the local data line pair,
   wherein during a digit precharge operation;
   the first line and the second line of the local data line pair are connected together by the equalization device;
   the first line, the second line or both of the local data line pair are connected to the midpoint potential by the digit precharge voltage circuit; and
   the first line and the second line are connected to the first digit line pair or the second digit line pair or both and provide the midpoint potential to the first digit line pair or the second digit line pair or both.

2. The apparatus of claim 1, wherein the equalization device selectively connects the first line and the second line based, at least in part, on a state of an equalization control signal provided to the equalization device.

3. A method comprising:
   connecting a first line and a second line of a local data line pair together;
   providing to the first line, the second line, or both a midpoint potential; and
   activating a plurality of column select signal lines to connect the local data line pair to a plurality of digit line pairs coupled to corresponding ones of a plurality of sense amplifiers while the first line and the second line are connected together and while the midpoint potential is provided to the first line, the second line, or both, wherein the midpoint potential is provided to the plurality of digit line pairs by the local data line pair during a digit line precharge operation.

4. The method of claim 3, wherein the column select signal is activated, based, at least in part, on an address associated with an access command.

5. The method of claim 3, wherein connecting the first line and the second line together drive the first line and the second line to the midpoint potential.

6. The method of claim 5, wherein the midpoint potential is equal to a digit line precharge potential.

7. A system comprising:
a plurality of digit line pairs;
a plurality of sense amplifiers coupled to corresponding ones of the plurality of digit line pairs;
a local data line pair configured to be selectively connected to the plurality of sense amplifiers;
a digit precharge voltage circuit consisting of a single transistor configured to selectively provide a digit line precharge potential to a first line, a second line, or both lines of the local data line pair; and
an equalization device consisting of a single transistor coupled between the first line and the second line of the local data line pair, wherein:
the equalization device is configured to selectively connect the first line and the second line together;
the equalization device is shared by the plurality of sense ainplifiers:
the digit precharge voltage circuit is coupled to the first line of the local data lie pair through the equalization device and the digit precharge voltage circuit is coupled to the second line of the local data line pair; and
during a digit precharge operation, the first line and the second line are connected together and connect to the plurality of digit lines, and the fust line, the second line or both lines are provided with the digit line precharge potential to provide the digit line precharge potential to the plurality of digit lines.

8. The system of claim 7, wherein the digit line precharge potential comprises a midpoint potential relative to a precharge potential of the local data line pair.

9. A method comprising:
connecting a local data line pair to a digit line pair;
connecting a first line and a second line of the local data line pair together;
driving the first line and the second line to a precharge voltage;
activating a column select signal line to connect the local data line pair to the digit line pair; and
providing, by connecting the local data lime pair to the digit line pair, the precharge voltage to the digit line pair during a digit line precharge operation.

10. An apparatus comprising:
a digit line pair;
a sense amplifier coupled to the digit line pair and configured to selectively connect the digit line pair to a local data line pair;
an equalization device consisting of a single transistor coupled between a first line and a second line of the local data line pair and configured to selectively connect the first line and the second line together; and
a digit precharge voltage circuit consisting of a single transistor coupled to a digit precharge potential and configured to selectively connect the first line and the second line to the digit line precharge potential;
wherein:

the digit precharge voltage circuit is coupled to the first line of the local data line pair through the equalization device;
the digit precharge voltage circuit is coupled to the second line of the local data line pair; and
during a digit precharge operation:
the first line and the second line of the local data line pair are connected together;
the first line and the second line of the local data line pair are connected to the digit line precharge potential; and
the first line and the second line of the local data line pair are connected to the first digit line pair to drive the first digit line pair to the digit line precharge potential.

11. The apparatus of claim 10, wherein the digit line precharge potential comprises a midpoint potential relative to a precharge potential of the local data line pair.

12. The apparatus of claim 10, wherein the first line of the local data line pair is coupled to first read/write circuity and the second line of the local data line pair is coupled to second read/write circuitry.

13. The apparatus of claim 12, further comprising:
a first precharge device coupled to a precharge potential of the local data line pair and coupled between the first line of the local data line pair and the first read/write circuitry; and
a second precharge device coupled to the precharge potential of the local data lie pair and coupled between the second line of the local data line pair and the second read/write circuitry.

14. The apparatus of claim 10, wherein:
the digit line pair is a first digit line pair;
the sense amplifier is a first sense amplifier;
the apparatus further comprises a second digit line pair and a second sense amplifier coupled to the second digit line pair; and
the second sense amplifier is configured to selectively connect the second digit line pair to the local data line pair.

15. The apparatus of claim 14, wherein the equalization device is shared by the first sense amplifier and the second sense amplifier.

16. The apparatus of claim 15, wherein during the digit precharge operation:
the first line and the second line of the local data line pair are connected to the digit line precharge potential; and
the first digit line pair or the second digit line pair or both are connected to the local data line pair to drive the first digit line pair or the second digit line pair or both to the digit line precharge potential.

17. The apparatus of claim 14, wherein the first sense amplifier and the second sense amplifier are included n a sense amplifier block.

18. The apparatus of claim 10, wherein the equalization device selectively connects the first lie and the second line of the local data line pair based, at least in part, on a state of an equalization control signal provided to the equalization device.

* * * * *